Oct. 15, 1957 G. R. PICKERING 2,809,426
SELF-LEVELING SPOON
Filed Dec. 6, 1955

INVENTOR
George R. Pickering

BY
ATTORNEY

United States Patent Office 2,809,426
Patented Oct. 15, 1957

2,809,426

SELF-LEVELING SPOON

George R. Pickering, Bakersfield, Calif.

Application December 6, 1955, Serial No. 551,349

3 Claims. (Cl. 30—324)

This invention relates to improvements in self-leveling spoons and, more particularly, to spoons primarily intended for the training of infants and small children when learning to feed themselves. Further, while the invention and title primarily have been directed to a spoon, it is to be understood that the invention can be applied with equal facility to forks. The term spoon therefore is to be regarded as generic to infants' spoons, forks, and the like.

A spoon is one of the first utensils with which an infant becomes familiar in learning to feed itself. However, most infants' spoons and forks for example are of a nature wherein the handle is rigid with the bowl of a spoon or tine portion of a fork. This fact, coupled with undeveloped muscular coordination results in an infant having considerable difficulty in keeping the bowl of a spoon, for example, substantially level while moving it to its mouth with food thereon. Considerable spilling of food results. After a few months practice, an infant's muscular coordination improves but, during such development period, much spilling takes place which could be largely prevented if it were not for the handle and bowl of the spoon, for example, being rigidly connected.

It is the principal object of the present invention to provide an eating utensil primarily adapted for use by infants learning to eat, the specific illustration thereof in the attached drawing comprising a spoon, the bowl being pivotally connected to the handle in such a manner that the construction is attractive in appearance, the pivotal connecting means is sanitary and readily capable of being cleansed, the assembling of the bowl with the handle is readily achieved, and the structure is capable of being manufactured at a cost comparable to that of conventional infants' feeding spoons.

Details of the invention are set forth in the following specification and illustrated in the drawing comprising a part thereof.

In the drawing, Fig. 1 is a top plan view of an exemplary spoon embodying the principles of the present invention.

Figure 1:
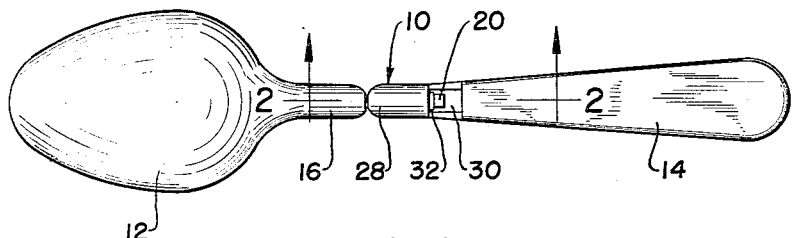

Referring to the drawings, the exemplary spoon 10 comprises a bowl 12 which is pivotally connected to a handle 14. The bowl 12 is provided with a tang or shank 16 which is integral with and projects substantially axially from one end of the bowl 12, said shank 16 also preferably being above the rim 18 of the bowl, whereby when the bowl is freely suspended from the shank 16, said bowl will assume a substantially horizontal position.

Projecting axially from the outer end of tang or shank 16 is a preferably cylindrical pintle 20 formed with an annular groove 22 near the terminal end thereof. The pintle 20 may be formed by molding or casting at the same time the bowl 12 and shank 16 are formed, whereby the pintle 20 will be integral with shank 16. However, in the event the bowl and tang are made for example from precious or semi-precious metals such as silver which is not as strong as other metals, it may be desired to form the pintle 20 of a stronger material such as stainless steel, hardened bronze, or the like. In this event, the pintle 20 could be provided with an extension 24 which is inserted in the shank 16 such for example as by being molded, in situ, therein at the time the bowl and tang or shank are molded. The pintle extension 24 could be formed with a suitable irregular or roughened surface in order to insure firm bonding thereof with the shank 16.

The cylindrical pintle 20 extends into an elongated longitudinal cylindrical bearing aperture 26 which extends inwardly from the inner end of handle shank 28 so as to intersect an open surface of said shank comprising one wall of another or second aperture or opening 30 which, for example, could be formed at the time the handle 14 is formed by casting, die-stamping, or otherwise. If desired, the bearing aperture 26 may be formed by a drilling operation after the handle is molded. Further, the diameters of the pintle 20 and bearing aperture 26 are such as to permit ready rotation of the bowl 12 relative to the handle 14 but any difference in diameter preferably should be relatively slight so as to not provide any substantial space within which food or other material could accumulate.

The pintle 20 is held in assembled relationship within the bearing aperture 26 by means of any suitable locking element such as a snap-ring 32. Said snap-ring 32 also is preferably formed by some non-corrodible material such as stainless steel, bronze, or the like. Further, it is preferred that a slight space be provided between the snap-ring 32 and the shoulder surface 34 in the handle against which it rotatably abuts.

Figure 2:
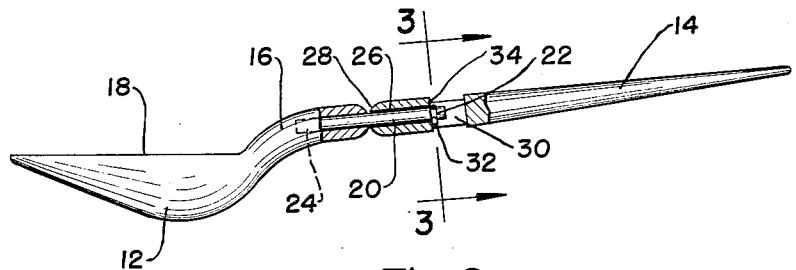
Fig. 2 is a side elevation of the exemplary spoon shown in Fig. 1 but part of the structure illustrated in Fig. 2 being shown in cross-section taken on the line 2—2 of Fig. 1.
Figure 3:
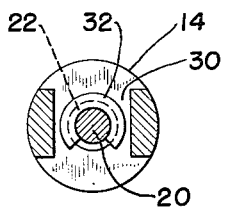
Fig. 3 is a sectional view taken on the line 3—3 of Fig. 2 and being illustrated on a larger scale than that used in Fig. 2.

To contribute to the appearance of the spoon illustrated in the drawing, it is preferred that the adjacent surfaces of the ends of tang or shank 16 and inner end of shank 28 of handle 14 be shaped attractively so as to present a pleasing appearance. For example, these adjacent ends may be rounded as illustrated in Figs. 1 and 2. Such arrangement also minimizes frictional contact between said tang and handle, thereby facilitating the free pivoting of the bowl 12 relative to handle 14 when held by an infant for example.

The aperture or opening 30 not only facilitates the attachment of the snap-ring 32 to the terminal end of pintle 20 so as to be received in the annular groove 22, but said opening also permits ready cleansing so as to prevent the accumulation of food or other material which might for example become spoiled and create a foul odor. Hence, the structure is readily capable of being cleansed and sterilized by washing or otherwise while in no way detracting from the free pivoting of the bowl relative to the handle 14.

From the foregoing, it will be seen that the present invention provides a construction whereby the bowl of a spoon for example may pivotally be connected to a handle whereby, when the handle is held by an infant and the spoon is used by the infant to learn to feed itself, the possibility of spilling of food from the bowl 12 is greatly minimized as compared with a structure wherein the bowl and handle are rigidly connected. The structure is also capable of inexpensive manufacture, ready assembly, and may be formed from a relatively wide range of different materials including various kinds of metal, synthetic resin, and the like.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

1. A self-leveling spoon comprising in combination, a spoon bowl having a tang projecting from one end thereof, said tang terminating in an elongated cylindrical pintle of smaller diameter than said tang and extending substantially axially therefrom at a level above the rim of said bowl, an elongated handle having a shank provided with an axial cylindrical bearing opening extending inwardly from the outer end thereof and rotatably receiving said pintle, said shank also having a second opening extending transversely therethrough and spaced from the outer end thereof so as to intersect said bearing opening, the terminal end of said pintle also extending into said second opening, and locking means disposed within said second opening and fixed to said terminal end of said pintle, said locking means extending radially outward from said pintle a greater distance than the walls of said bearing opening to prevent relative axial movement therebetween while permitting free rotative movement of said bowl and pintle relative to said bearing and handle.

2. A self-leveling spoon comprising in combination, a spoon bowl having a tang projecting from one end thereof, said tang terminating in an elongated cylindrical pintle of smaller diameter than said tang and extending substantially axially therefrom at a level above the rim of said bowl, the outer end of said pintle having an annular groove adjacent the terminal end thereof, an elongated handle having a shank provided with an axial cylindrical bearing opening extending inwardly from the outer end thereof and rotatably receiving said pintle, said shank also having a second opening extending transversely therethrough and spaced from the outer end thereof so as to intersect said bearing opening, the terminal end of said pintle and annular groove therein extending into said second opening, and locking means comprising a snap-ring received by said annular groove in said pintle and disposed within said second opening to permit free rotative movement of said bowl and pintle relative to said bearing and handle but abutting a surface of said shank defining said second opening to prevent axial movement between said pintle and shank.

3. A self-leveling spoon comprising in combination, a spoon bowl having a shank projecting from one end thereof and extending substantially axially therefrom at a level above the rim of said bowl, an elongated handle having a shank at one end, one of said shanks having an elongated cylindrical bearing extending inwardly from the outer end thereof axially of said shank for only a portion of the length thereof and intersecting an open surface on said shank, the portions of said one shank defining the opposite ends of said bearing comprising positioning surfaces, a pintle fixed to and projecting from the other shank and extending longitudinally therefrom, said pintle being rotatably disposed within said bearing and projecting beyond said bearing into said open space and the end of said other shank abutting one of said positioning surfaces at the end of the bearing, and locking means fixed to the projecting end of said pintle and disposed in said open space and engageable with the other positioning surface at the other end of said bearing to prevent separative axial movement of said pintle from said bearing but permit free rotation of said spoon bowl relative to said handle about the axis of said bearing.

References Cited in the file of this patent

UNITED STATES PATENTS

| | | |
|---|---|---|
| 659,341 | Dodd et al. | Oct. 9, 1900 |
| 2,505,122 | Krieger | Apr. 25, 1950 |
| 2,741,027 | Margolin | Apr. 10, 1956 |